US005168158A

United States Patent [19]

McComas et al.

[11] Patent Number: 5,168,158

[45] Date of Patent: Dec. 1, 1992

[54] LINEAR ELECTRIC FIELD MASS SPECTROMETRY

[75] Inventors: David J. McComas; Jane E. Nordholt, both of Los Alamos, N. Mex.

[73] Assignee: The United States of America as represented by the United States Department of Energy, Washington, D.C.

[21] Appl. No.: 678,081

[22] Filed: Mar. 29, 1991

[51] Int. Cl.[5] ........................ B01D 59/44; H01J 49/00

[52] U.S. Cl. .................................... 250/287; 250/282

[58] Field of Search ................ 250/281, 282, 287, 288

[56] References Cited

U.S. PATENT DOCUMENTS

| | | | |
|---|---|---|---|
| H406 | 1/1988 | Wohltjen | 436/153 |
| 4,072,862 | 2/1978 | Mamyrin et al. | 250/286 |
| 4,611,118 | 9/1986 | Managadze | 250/287 |
| 4,694,168 | 9/1987 | Le Beyec et al. | 250/287 |
| 4,731,532 | 3/1988 | Frey et al. | 250/287 |
| 4,778,993 | 10/1988 | Waugh | 250/287 |
| 5,026,988 | 6/1991 | Mendenhall et al. | 250/287 |
| 5,065,018 | 11/1991 | Bechtold et al. | 250/287 |

OTHER PUBLICATIONS

G. Gloeckler et al., "Time-Of-Flight Technique for Particle Identification at Energies from 2-400 keV/Nucleon", Nucl. Instrum. and Method 165, 537-544 (1979).

George Gloeckler, "Ion Composition Measurement Techniques for Space Plasmas", accepted for publication in Review of Scientific Instruments, May 17, 1990.

D. Price et al., "Recent Developments in Techniques Utilizing Time-Of-Flight Mass Spectrometry", Int. J. of Mass Spectrometry and Ion Processes 60, 61-81 (1984 Elsevier Science Publishers B.V.).

D. M. Lubman et al., "Linear Mass Reflection with a Laser Photoionization Source for Time-of-Flight Mass Spectrometry", Anal. Chem 55, 1437-1440 (1983).

D. C. Hamilton et al., "A New High Resolution Electrostatic Ion Mass Analyzer using Time of Flight", to be published in Review of Scientific Instruments, Oct. 1990.

E. Mobius et al., "High Mass Resolution Isochronous Time-of-Flight Spectrograph For Three-Dimensional Space Plasma Measurements", to be published in Review of Scientific Instruments, Oct. 1990.

*Primary Examiner*—Bruce C. Anderson

*Attorney, Agent, or Firm*—Richard J. Cordovano; Paul D. Gaetjens; William R. Moser

[57] ABSTRACT

A mass spectrometer and methods for mass spectrometry. The apparatus is compact and of low weight and has a low power requirement, making it suitable for use on a space satellite and as a portable detector for the presence of substances. High mass resolution measurements are made by timing ions moving through a gridless cylindrically symmetric linear electric field.

11 Claims, 7 Drawing Sheets

LINEAR ELECTRIC FIELD MASS SPECTROMETRY

This invention relates to the field of chemical analysis and, more particularly, to the fields of positive ion mass spectrometry and neutral mass spectrometry. This invention is the result of a contract with the Department of Energy (Contract No. W-7405-ENG-36).

BACKGROUND OF THE INVENTION

This invention was born of the need for a robust and compact three dimensional mass spectrometer having a low weight and low power requirement for use in space. These characteristics of the invention also make it quite useful in certain earth based applications. It can identify atoms and molecules and distinguish between them.

The function of this mass spectrometer in space is to analyze the types of ionized particles in the region of the spacecraft on which it is mounted. A great deal can be learned about the interactions of planetary magnetospheres with a planet's atmosphere and the solar wind by analyzing the types of particles in the different regions of space around and between the planets. Different ion species come from the sun than from the upper atmosphere of a planet or off the surface of a moon and composition characterizes the source of the local plasma. These interactions and sources are very important to understand because they contributed to the radiation environment as well as telling us about the composition of local bodies.

This mass spectrometer is suitable for any space mission in which measurements of the local plasma composition are needed. It can be used in many different space plasma regimes by tailoring its field, size, and voltages to the expected plasma energies and densities. In addition, the LEF module of this spectrometer is compatible with many different types of energy analyzers. An energy analyzer is used to feed particles to the LEF module for mass analysis. Because the LEF can be used with many different analyzers, instruments in which it is used can be designed to have widely varying sensitivities and fields of view. This is very important, for example, in the case of a spinning versus a 3-axis stabilized spacecraft; to see all of space instruments must have different fields of view.

Most plasmas observed in space contain a variety of particles of different masses and ionization states. A determination of the distribution of mass and charge states often allows one to distinguish between different possible sources and sinks for the plasma and can provide information on the sources which is otherwise not obtainable. Mass spectrometers for measuring space plasma composition have been developed, but to date no instrument has provided the important combination of (1) nearly complete viewing coverage, (2) high temporal resolution (a few seconds) for a mass resolved set of distribution functions, and (3) ultra-high mass/charge resolution over a large energy range.

Space plasma instruments for mass resolved plasma measurements have utilized mainly two techniques: magnetic mass analysis and field-free time-of-flight (TOF) analysis. Magnetic mass spectrometers have certain inherent drawbacks which limit their use for the measurement of hot magnetospheric plasmas. These instruments are expected to measure ions with energies as high as about 50 keV/q. Achieving high mass resolution of particles at this energy level with an instrument that has the necessary very wide acceptance geometry requires a large amount of heavy magnetic material. Also the requirement for high sensitivity, which is needed to make fast measurements of hot diffuse magnetospheric plasmas, competes with the requirement for high mass resolution, since the aperture size needs to be large for the former and small for the latter.

TOF mass spectrometers with essentially field-free flight paths have the advantage that the entrance aperture to the mass resolving region can be much larger than in a comparable resolution magnetic mass spectrometer, thus providing higher sensitivity and a broader energy range for an instrument of a particular size. A main limiting factor for mass resolution in this type of TOF mass spectrometer is the energy spread of the ions entering the timing section of the device. Also, resolution is degraded by path length variations for the timed portion of flight of the ion. Both the magnetic and field-free TOF mass analysis techniques suffer from limitations which reduce the utility for making fast highly mass resolved measurements of the three-dimensional distribution of hot plasmas.

On earth, the inventive mass spectrometer may be used in a laboratory or as a portable instrument for detecting substances in the atmosphere. Virtually every solid material has a vapor pressure, that is, has atoms or molecules of the material present in the form of a vapor in the atmosphere adjacent to the solid material. These atoms or molecules can be captured, ionized, and analyzed to determine what substances were or are present in a room or the immediate atmosphere where a portable instrument is located. Substances such as explosives and narcotics can be detected.

BRIEF DESCRIPTION OF THE INVENTION

This invention is a mass spectrometer and methods for mass spectrometry. The apparatus is compact and of low weight and has a low power requirement, making it suitable for use on a space satellite and as a portable detector for the presence of substances. High mass resolution measurements are made by timing ions moving through a gridless cylindrically symmetric linear electric field. On a spinning spacecraft or rotating platform in space, it captures ions moving in all three dimensions.

It is an object of this invention to provide a cylindrically symmetric linear electric field for use in mass spectroscopy.

It is another object of this invention to provide a mass spectrometer which does not require internal grids (which scatter ions) to achieve the field configuration.

It is also an object of this invention to provide a mass spectrometer which will capture ions moving in all three dimensions and has single start and stop detectors for use in determining time of flight.

It is a further object of this invention to provide a mass spectrometer which has variable resolution and sensitivity.

DETAILED DESCRIPTION OF THE INVENTION

Figure 1:
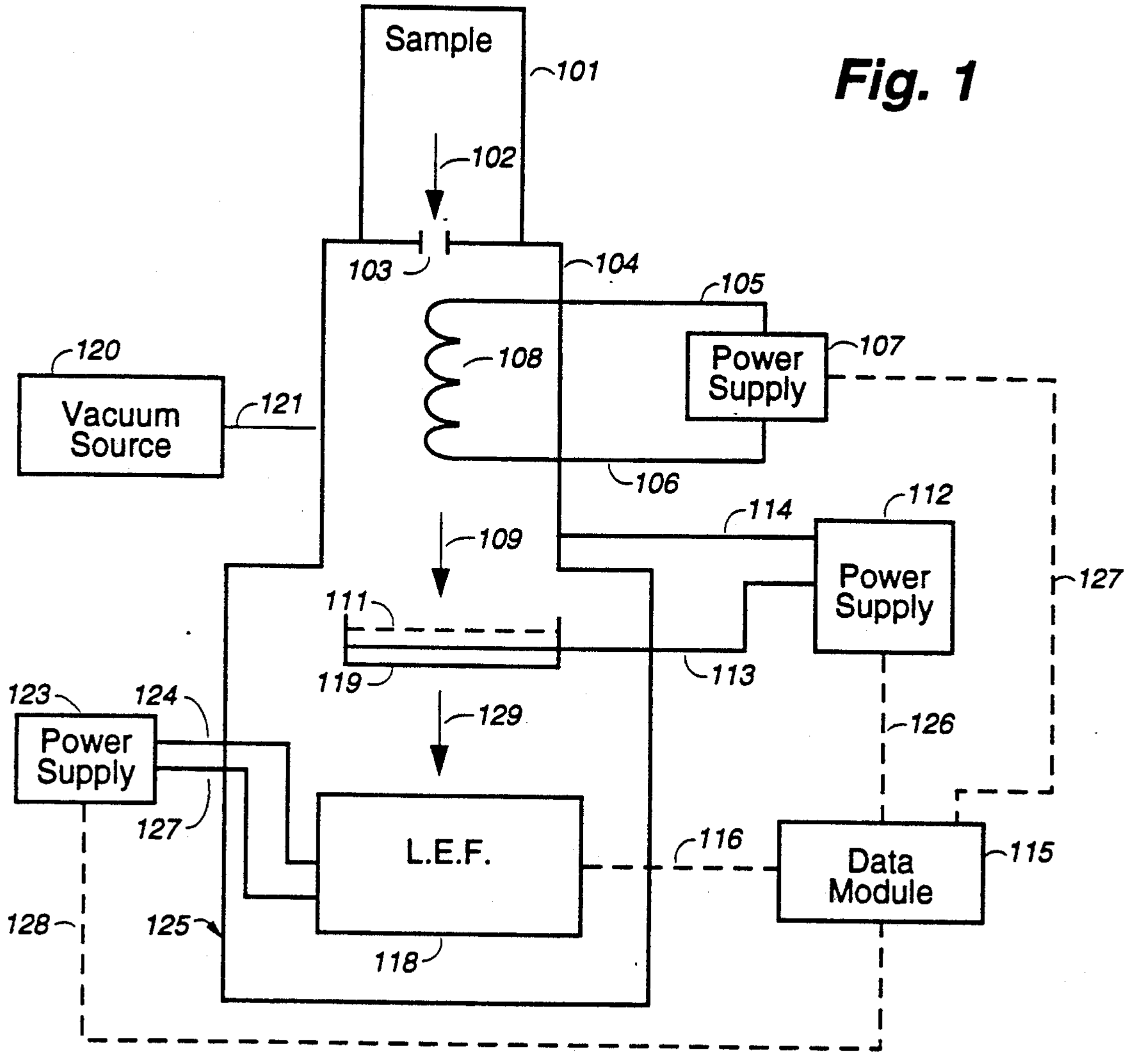
FIG. 1 is a schematic block diagram of a linear electric field mass spectrograph suitable for use on earth.

A brief discussion of the LEF module will be helpful before reading the detailed description of the module. As a particle enters the LEF module through the carbon foil, it knocks an electron off the foil (in most instances). This electron is steered and accelerated by the electric field onto a detector at the opposite end of the module. The pulse produced by the electron striking the detector starts a timer. Returning to the particle itself, the field turns the particle around and causes it to return to the same end at which it entered the LEF module, where it strikes the detector mounted at that end. The pulse produced by the ion impinging on the detector stops the clock and the data processing module determines the type of particle from the time on the clock. Each species has a unique time signature which can be explained by analogy with a mass on a spring. The period of oscillation of a mass on a spring is uniquely determined by the stiffness of the spring and the mass of the particle. For a given spring the frequency of oscillation depends only on the mass hung on it. The speed at which the mass is set in motion only affects the amplitude of the oscillation, not the frequency. The linear electric field acts as an unchanging spring and thus the device is insensitive to the intitial speed (energy) and direction of the particle.

Often the incoming particle will start the clock but will be neutralized by the foil In this case it will be unaffected by the electric field and travel straight through the device. If this happens, the ion is detected at the high end of the module and the clock is stopped. The data processing module can then determine the particle type with a reduced resolution using a different method of calculation. This is a great advantage as the device can simultaneously be both more sensitive (neutral mode) and have higher resolution (charged mode) than conventional spectrometers, which must trade off resolution for higher sensitivity or dynamic range.

If the particle passing through the foil is a molecular ion, it is broken up into its constituent pieces, which produce a unique signature. This is because elemental ions have a minimum energy determined by the input portion of the mass spectrometer and will have to travel deeply into the LEF module before the electric field turns them around; most of their flight time is spent near their turn around point. In contrast, the fragments of molecular ions carry only a portion of the energy of the original molecule and so they do not penetrate into the LEF module as deeply as the atomic ions before they are turned around. The entrance end of the field can then be tailored so that particles turned around there have flight times that are different from others of the same mass per charge. This does not have much effect on the overall resolution of the device and gives it the unique ability to separate molecular species that would otherwise be indistinguishable. An example of this are the ions $CO+$ and $N_2+$; these would normally require a resolution of 2800 to separate, but are easily separated by an LEF with an overall resolution of only $\sim 50$.

Referring to the embodiment of the invention depicted in FIG. 1, which is a mass spectrometer for use on earth, container 101 holds a sample of a gas which is to be analyzed. Container 101 is attached to ionization chamber 104 (attachment means not shown), which is part of housing 125. As shown by arrow 102 gas flows through a calibrated orifice 103 into ionization chamber 104. Other means of supplying a gas to the calibrated orifice may be used. For example, a blower may be used to draw room air into the ionization chamber to determine whether molecules or molecular fragments of an explosive substance are present; this would show that the explosive was or is in the room. The gas is ionized by means of resistance filament 108, which is powered by power supply 107 through leads 105 and 106. Other means of ionizing the gas, which are known to those skilled in the art, may be used. Ions are captured and accelerated by the electric field between grid 111 and ionization chamber 104, which is of a conductive material. Grid voltage is provided by power supply 112. and electrical leads 113 and 114. Arrow 109 shows the direction of movement of ions. The amount of energy per charge imparted to an ion by this electric field is known, since the voltage applied is known. Ions pass through grid 111 and foil member 119 and into linear electric field (LEF) module 118 as indicated by arrow 129. The LEF module is shown in detail in FIGS. 2 and 3 and explained below. Operation of the foil element is explained below. Power supply 123 provides power to the linear electric field by means of leads 124 and 127. As many as four or more separate power supplies may be used for the LEF module, as explained below. Data module 115 acquires information from the linear electric field module and the power supplies by means of data paths 116, 126, 127, and 128 and may transmit control signals along the same data paths. The data module is comprised of a computer which is programmed to provide m/q (mass per charge) and other information on ions which have been subjected to analysis by this mass spectrometer and to provide control inputs to the spectrometer components. For example, the data module may be used to alter the strength of the electric field used to accelerate ions. Vacuum source 120 is used to provide a vacuum in housing 125 by means of pipeline 121.

Figure 3:
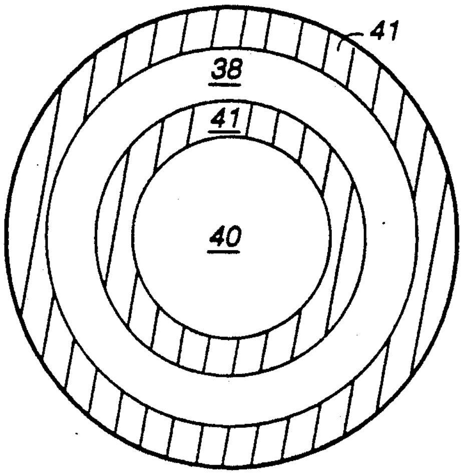
FIG. 3 is a view of the LEF module of FIG. 2 taken as indicated by the section arrows shown in FIG. 2; the entire cross-section is shown.
Figure 2:
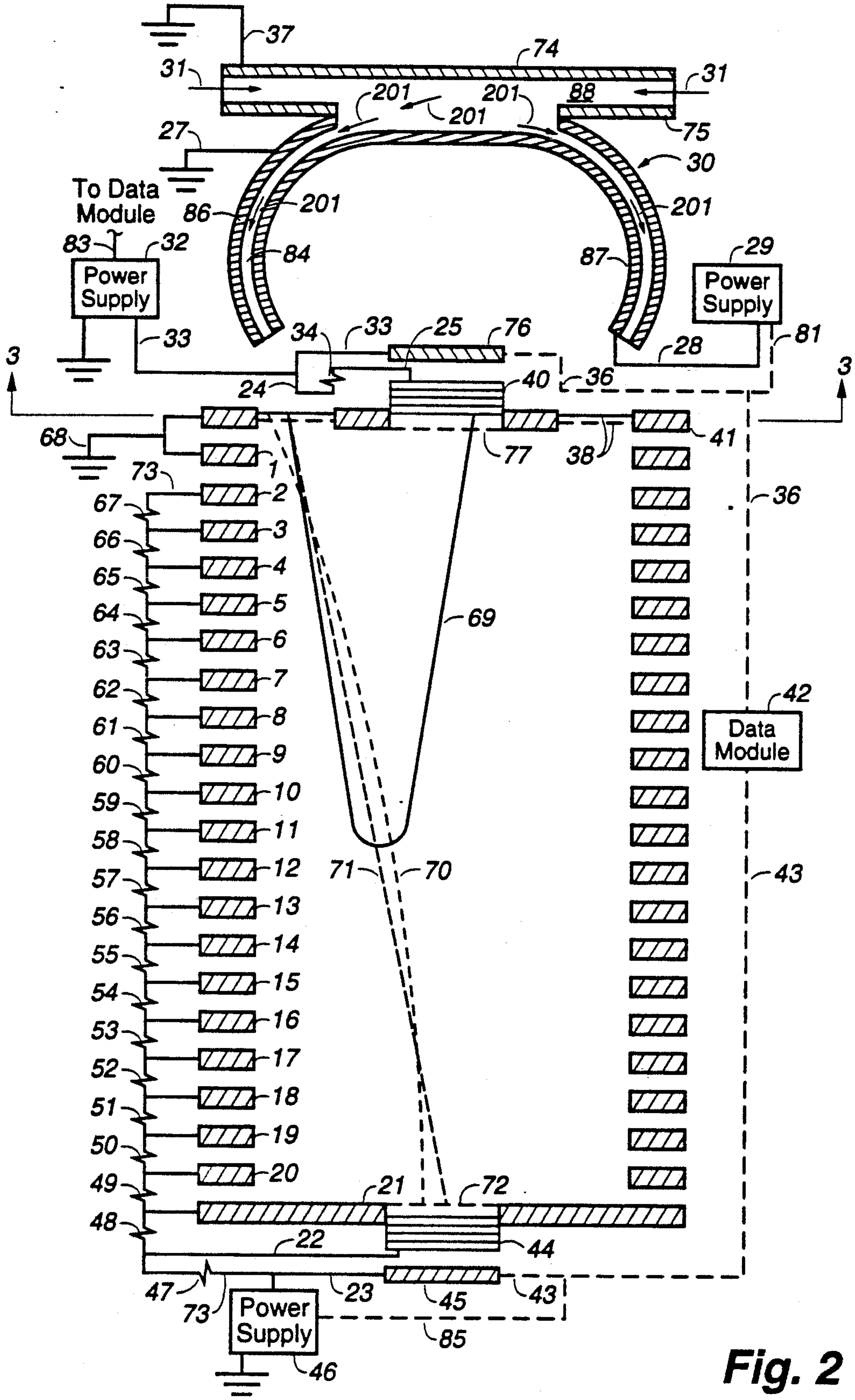
FIG. 2 is a schematic diagram in vertical cross-section of a mass spectrometer suitable for use in space. It is comprised of ion capture apparatus and apparatus for producing a linear electric field and determining the time of flight of particles in that field.

A prototype of the invention was constructed for use in ground-based testing of a mass spectrometer designed for use in space. The prototype is comprised of a "front end", which is known as an electrostatic analyzer, and an LEF module. The electrostatic analyzer is configured such that ions moving in space will enter it and a portion of those ions will pass out of it and into the LEF module. When in space, the mass spectrometer will be rotating such that it will sample ions from all directions. FIG. 2 generally depicts the prototype, which is described in the following paragraphs. FIG. 2 is a vertical section taken through the centerline of the apparatus. FIG. 3 depicts a section taken as shown by the section arrows adjacent to the front end cap in FIG. 2; the entire cross-section is shown.

The linear electric field module of FIG. 2 is comprised of a plurality of guard rings 1 through 20 which are identical to one another and are in the form of circular flat plates which have circular center portions removed to form annular shapes. The rings are disposed parallel to one another, share a common central axis, and have an outside diameter of 11 cm and an inside diameter of 9 cm. Each ring is 0.1 cm thick and spacing between rings is 0.2 cm. A entrance end cap 41 and a high end cap 21 are provided at the ends of the stack of rings 1 through 20, each cap being a circular flat plate of the same diameter as the outside diameter of the rings. The guard rings and end caps are constructed of an aluminum alloy; they may be constructed of another appropriate conductive material. Entrance end cap 41 has an annular portion of the flat plate removed and replaced by foil member 38, which is described below. Also, the center portion of entrance end cap 41 is removed and replaced by detector 40 which has grid 77 mounted in front of it. FIG. 3 depicts entrance end cap 41 in a section view taken as shown by the section arrows in FIG. 2 which shows foil member 38 and detector 40. In the same manner, high end cap 21 has detector 44 and grid 72 mounted in its center. The stack of rings and the two caps are held together by three ceramic rods which are not shown in FIG. 2. Other non-conductive methods of support may be used.

An approximately linear electric field is formed within the rings and end caps by applying voltages of varying magnitudes to them. Power supply 46 is electrically connected to rings 2 through 20 and high end cap 21 by means of lead 73. Resistance elements 48 through 67 are used to vary the voltages applied to the guard rings and high end cap. Table I shows the voltages at rings 1 through and at high end cap 21. Ring 1 and entrance end cap 41 are at an electrical potential of zero, as shown by ground symbol 68. It can be seen that the electric field varies in strength from a minimum at the entrance end to a maximum at the high end. Power supply 46 also provides bias voltage to anode 45 by lead 23 and power to the back end of detector 44 by means of resistor 47 and lead 22. Power supply 32 provides bias voltage to anode 76 via leads 33 and 24 and power to the back end of detector 40 by means of leads 33 and 25 and resistance element 34. Table I shows the voltages provided at detector 44 and to anode 45 by means of leads 22 and 23 and also the voltages provided at detector 40 and anode 76 by means of leads 24 and 33 and resistor 34. Of course, the numerical values of the voltages may be varied from those which were used in the experimentation with the prototype as long as they are such as to produce an approximately linear electric field. In a similar manner, the number and spacing of the guard rings may be varied. Those skilled in the art will appreciate that the field is not rigorously linear, but that by varying voltages in the LEF module, a close approximation is attained.

TABLE I

| Reference No. | Voltage | Reference No. | Voltage |
|---|---|---|---|
| 76 | 2,200 | 12 | 2,871 |
| 40 | 1,800 | 13 | 3,750 |
| 1 | 0 | 14 | 4,746 |
| 2 | 18 | 15 | 5,860 |
| 3 | 30 | 16 | 7,090 |
| 4 | 59 | 17 | 8,437 |
| 5 | 120 | 18 | 9,902 |
| 6 | 235 | 19 | 11,485 |
| 7 | 527 | 20 | 13,184 |

TABLE I-continued

| Reference No. | Voltage | Reference No. | Voltage |
|---|---|---|---|
| 8 | 937 | 21 | 15,000 |
| 9 | 1,380 | 44 | 17,100 |
| 10 | 1,465 | 45 | 17,200 |
| 11 | 2,110 | | |

A toroidal "top hat" analyzer which serves as the "front end" of the mass spectrometer is depicted by reference number 30 of FIG. 2. The toroidal shape is used rather than the more common spherical "top hat" analyzer in order to obtain better sensitivity. There are several other types of electrostatic analyzers which may be used as front ends in this invention; these are well-known to those skilled in the art. The analyzer was used in a limited manner in the experimentation because it was not considered necessary to subject it to extensive testing and it was not needed. In the experimentation accomplished using the prototype, a duoplasmatron low energy particle accelerator provided by the High Voltage Energy Co. was utilized to provide ions. Gas was bled into the unit and ionized by means of an electron impact ionizer. The linear electric field module was contained in a vacuum chamber held at a pressure of about $10^{-8}$ Torr. The energy possessed by the ions provided by the accelerator was known and, since they came from a single source location, it was not necessary to capture them.

Returning to FIG. 2, the electrostatic analyzer is shown in vertical section. The purpose of the front end is to capture positive ions which have an E/q within a previously established range and route them to the linear electric field module. Reference numbers 74 and 75 denote two spaced-apart circular flat plates which are perpendicular to the plane of FIG. 2. Plate 75 has its center section removed and is connected to a first toroidal shape 86, which has a top portion removed to correspond to the removed portion of the plate. A lower portion of toroidal shape 86 is removed as if it were cut away by a plane parallel to plates 74 and 75. A second toroidal shape 87 is smaller than the toroidal shape connected to plate 75 and is located inside and "parallel" to the first toroidal shape such that there is a space 84 between the two toroids. The lower portion of the second toroidal shape is also removed, in the same manner as toroidal shape 86, so that ions may exit from space 84. Ions enter the space 88 formed by plates 74 and 75 as shown by arrows 31. The field of view of the toroidal analyzer is 360°, that is, ions can enter at any point around the perimeter of the space between circular plates 74 and 75. The ions travel through the front end in space 84 between the two toroids toward foil element 38 as shown by arrows 201. Power supply 29 provides an electrical potential between the toroidal shapes by means of lead 28. Toroidal shape 86 is at ground potential. Note that plates 74 and 75 must also be at 0 potential in order to avoid electrical interference with other portions of the spacecraft on which the mass spectrometer is installed.

Ions leaving the toroidal analyzer pass through foil member 38, which is a carbon foil mounted on a highly transmissive grid to provide support. The foil member shown in FIGS. 2 and 3 is annular in configuration so that ions captured at any point around the 360° field of view of the front end will pass through the foil. However, the foil member actually used in the prototype was not annular but circular in shape since the ions used in the experimentation were provided from a single source location rather than being collected at many points around the 360° angle of view of the toroidal analyzer, making use of the annular foil unnecessary. The foil used in the prototype was obtained from Arizona Carbon Foil, Inc. and has a thickness which may be stated as $0.5\times10^{-6}$ g/cm$^2$. It is expected that foils having thicknesses of $0.1\times10^{-6}$ to $1.0\times10^{-5}$ g/cm$^2$ may be used for this application.

Figure 4:
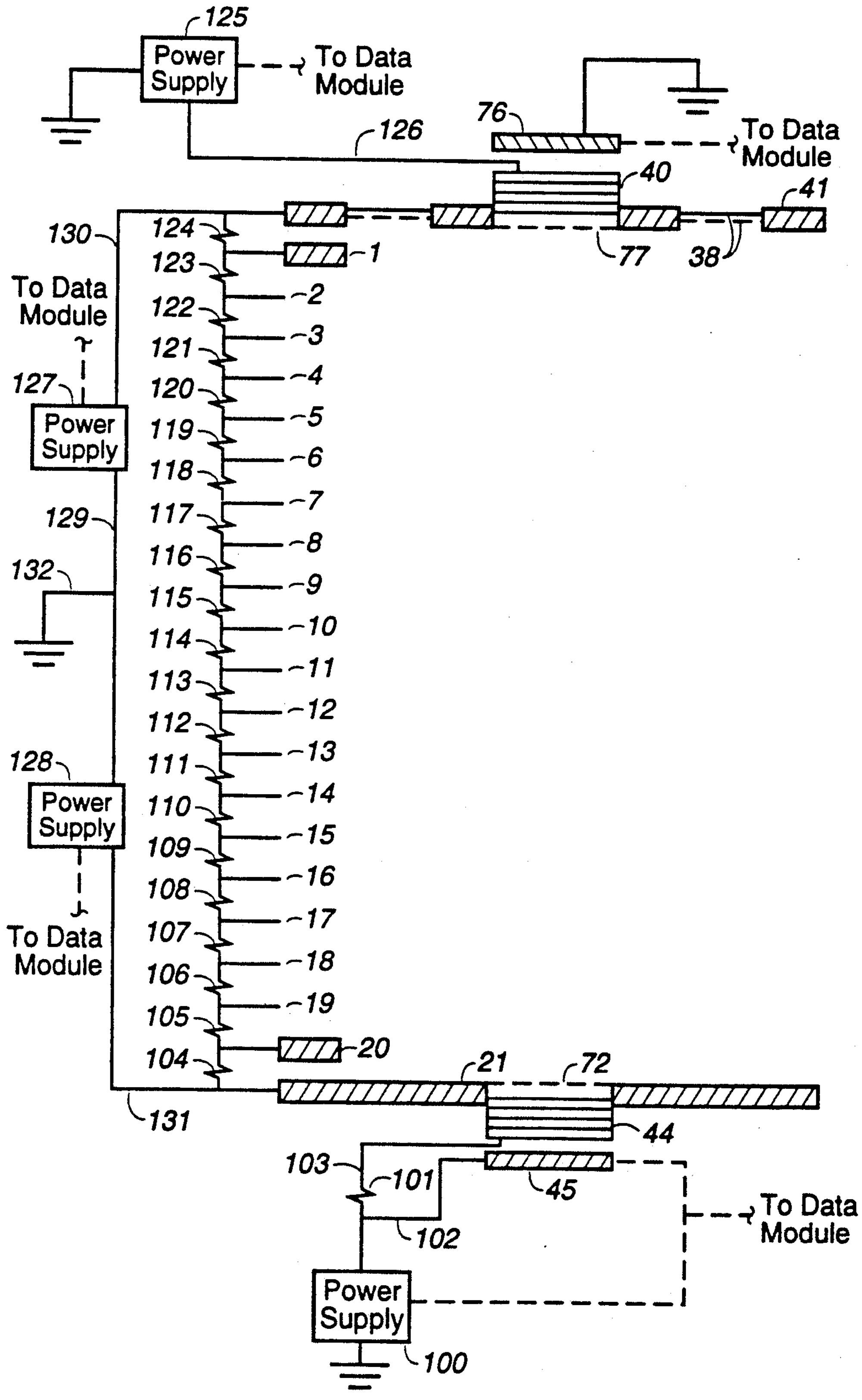
FIG. 4 is a schematic diagram in vertical section similar to FIG. 2 which shows only a portion of an LEF module.

In space applications where it is desired to analyze ions with low energies, it is necessary to accelerate the ions. Without acceleration, entering low energy ions would not have sufficient energy to be analyzed in the LEF module. To do so, an electrical potential is provided at foil member 38: this requires changes from the configuration of FIG. 2 which are shown in FIG. 4. Components which are unchanged from FIG. 2 have the same reference numbers as they do in FIG. 2. Referring to FIG. 4, four power supplies are used. Table II shows the voltages at various points. As in the previously discussed embodiment, other values may be used, which can be determined by those skilled in the art, which conform with the necessary parameters and provide an approximately linear electric field. Also, a different number of rings may be used.

Power supplies 127 and 128 provide voltage to the end caps (21 and 41) and rings (1-20) by means of leads 130 and 131. The two power supplies are connected by lead 129, which is at 0 potential, as shown by ground symbol 132. The voltages are adjusted to the values shown in Table II by means of resistance elements 104 through 124, whose values can be calculated by those skilled in the art. The foil element is in electrical contact with the end cap. This provides the electrical potential which accelerates ions leaving the front end. Because the voltage at the foil element is known, the amount of energy added to an ion is known. The front end of detector 40 is in electrical contact with the end plate, thereby receiving power from the power supply via the end cap. Power supply 125 provides power to the back end of detector 40 via lead 126. In order for the detection system to function properly, the potential must be more positive from the front of detector 40 to anode 76. At the high end of the LEF module, the same principle applies for the detection system. Power supply 100 provides power to anode 45 via lead 102 and to the back end of detector 44 via lead 103 and resistance element 101. To reduce the size of power supply 100, it may float on the other power supply and thus be required to provide only 2.1 kV, rather than the full required voltage of 22.1 kV. The front end of detector 44 receives power from end cap 21, with which it is in electrical contact. As discussed in regard to FIG. 2, certain elements are linked to the data module. An advantage of using separate power supplies is that the voltage supplied to the multichannel plates and anodes can be adjusted as they age.

TABLE II

| Reference No. | Voltage | Reference No. | Voltage |
|---|---|---|---|
| 76 | 0 | 11 | −9024 |
| 40 | −1000 | 12 | −6938 |
| 41 | −20.000 | 13 | −4671 |
| 1 | −19.909 | 14 | −2222 |
| 2 | −19.637 | 15 | +408 |
| 3 | −19.183 | 16 | +3219 |
| 4 | −18.548 | 17 | +6213 |
| 5 | −17.732 | 18 | +9387 |
| 6 | −16.734 | 19 | +12.744 |

TABLE II-continued

| Reference No. | Voltage | Reference No. | Voltage |
|---|---|---|---|
| 7 | −15.555 | 20 | +16.281 |
| 8 | −14,195 | 21 | +20.000 |
| 9 | −12.653 | 44 | +22.000 |
| 10 | −10.929 | 45 | +22.100 |

Upon passing through the foil, some of the ions are converted to neutral particles. Most ions passing through the foil cause an electron to be emitted from the foil. Returning now to FIG. 2, these particles (ions, neutrals, and electrons) travel in the field as shown by paths 69, 71, and 70. Most ions are deflected by the electric field such that they do not reach the high end of the field, as shown by representative ion path 69. The ions travel toward the high end of the field for a distance which is determined by the characteristics of the particle and the strength of the electric field, as will be explained below. The deflected ions strike detector 40, which is a stack of microchannel plates. The microchannel plate detectors used in the prototype were provided by Galileo Electrooptics Corporation of Sturbridge, Mass. and are also available from other suppliers. A suppression grid 77 which will transmit about 90% of the electrons incident upon it is located in front of detector 40 and is electrically connected to end cap 41. The grid prevents electrons from moving from detector 40 into the field. Upon being struck by an ion, detector 40 emits a cascade of electrons, which is sensed by anode 76, which provides a signal to data module 42 by means of data path 36. Detectors of other types can be used, such as those based upon use of channel electron modifiers.

As mentioned above, the passage of an ion through foil member 38 usually causes the foil member to emit an electron and also the ion may be converted to a neutral particle. An emitted electron and a neutral travel through the linear electric field to detector 44, as shown by electron path 70 and neutral path 71. Detector 44 is a stack of microchannel plates similar to detector 40. Transmissive grid 72, which is similar to grid 77, is located in front of detector 44 and is electrically connected to high end cap 21. When an electron or a neutral strikes detector 44, a cascade of electrons is emitted by the detector and sensed by anode 45, which provides a signal to data module 42 by means of data path 43. The front end of the mass spectrometer will be oriented with respect to the LEF module so that a particle not affected by the field, that is, a neutral, will strike detector 44 at its center. The particle-receiving surface of a preferred detector will be divided into regions and information on the region which a particle strikes will be provided to the data module. The prototype did not utilize such a detector. The regions will be defined by radials of the circular surface of the detector and by a central circle having a diameter smaller than the diameter of the detector. This will permit the approximate point of entry of an ion around the 360° field of view of the toroidal analyzer to be determined. Also, this will provide information on mass resolution levels of neutral particles.

Figure 5:
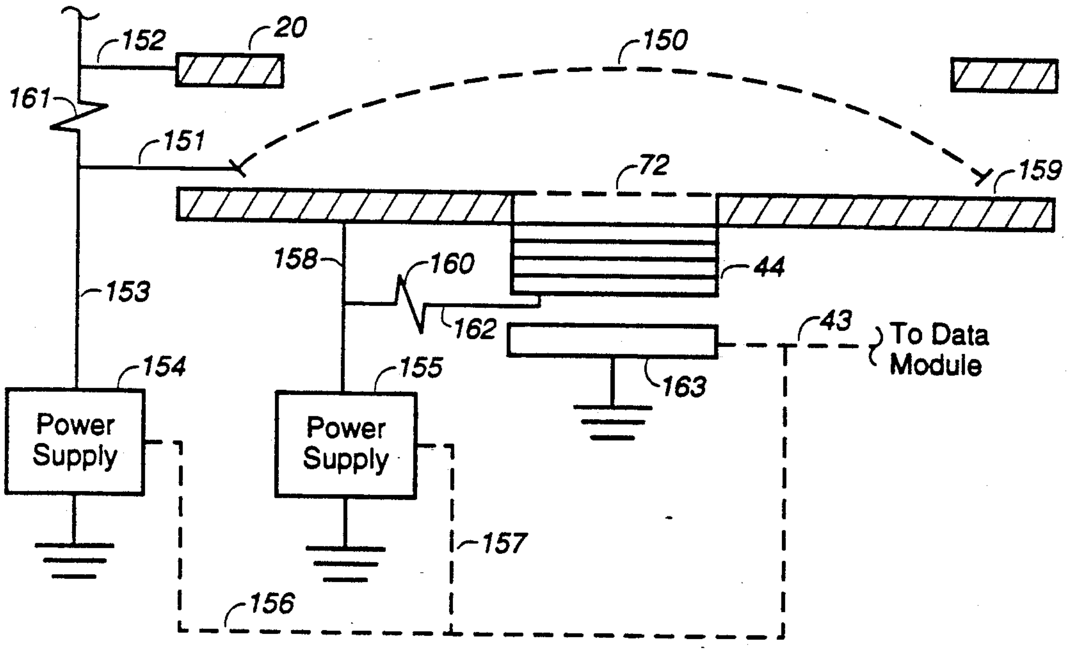
FIG. 5 is a schematic diagram in vertical section similar to FIG. 2 which shows a preferred embodiment of the high end of an LEF module.

FIG. 5 depicts an alternate configuration of the high end of the LEF module, which may be preferred to the configuration shown in FIG. 2 in that it should improve the resolution of the instrument. Components which are unchanged from FIG. 2 have the same reference numbers as in FIG. 2. Referring to FIG. 5, the high end of the electric field will be defined by curved grid 150 rather than high end cap 159. Detector 44 with screen 72 will be mounted on the end cap in the same manner as shown in FIG. 2. Voltage at grid 150 will be provided by power supply 154 and leads 153 and 151 and will be the same as provided at end cap 21 of FIG. 2 (see Table I). Voltage will be supplied to the rings in the same manner as in FIG. 2. For example, resistor 161 will drop the voltage supplied to ring 20 by lead 151. A separate power supply 155 will be used to provide −1 kV at end plate 159 via lead 158 and the front end of detector 44 via lead 162 and resistor 160. The voltage at about the back end of the detector provided by lead 162 would be about −100 V and anode 163 would be at 0 V. It is advantageous to use the separate power supply (155) because smaller resistors may be used and voltage to detector 44 may be independently varied.

Returning now to FIG. 2, in addition to the signals provided to data module 42 by data paths 36 and 43 from detectors 40 and 44, data may be provided to the data module from power supply 29 by data paths 81 and 36, from power supply 46 by data paths 85 and 43, and from power supply 32 by data path 83. The data module is comprised of a computer and input and output devices and circuitry. The data paths may be used to transmit control signals; for example, the computer of the data module may supply a control signal to power supply 46 to establish a particular value of output voltage.

The voltage across toroidal shapes 86 and 87, is set to a particular value in order to permit only ions having a particular range of E/q values to pass through the toroidal analyzer. E/q refers to the quantity obtained by dividing the energy (E) possessed by an ion by its charge (q). It is expected that, in space applications, the voltage between the toroids will be in the range of 0.2 to 2000 V. The distance between the shapes, along with the voltage, determines which ions will travel through the analyzer 30 to pass through foil member 38. Ions having an E/q outside the chosen range will collide with the surfaces of the toroids and stick or be adsorbed instead of passing through the analyzer. Thus, the E/q of ions travelling out of the analyzer is known within a particular range, which will usually be established at about ±10% for most space applications.

The time of flight of an ion through the linear electric field is determined in data module 42 by means of a "start timing signal" provided to the data module when an electron strikes detector 44 and a "stop timing signal" provided to the data module when the ion strikes detector 40. Travel times of all electrons emitted from foil member 38 when an ion passes through it to detector 44 are so nearly the same that the actual time may be replaced with a single constant value in the calculations or travel time may be calibrated out of the time of flight of the ion. In the prototype, travel time of an electron is about one nanosecond while that of various ions is in the range of about 100–1000 nanoseconds. If passage of an ion through the foil element does not cause an electron to be emitted from the foil element, that ion cannot be timed and the apparatus provides no information on it.

An equation used to calculate the mass of an ion divided by its charge (m/q) is derived as follows. For an electric field which increases linearly with distance along an axis z, the strength of the field E can be expressed by $$E=-kz$$

where k is a constant solely dependent upon the electromechanical configuration of the apparatus which provides the electric field (it is roughly equal to the voltage across the LEF module divided by the square of its length). The electrostatic force acting to retard motion of the ion in the field is qE. Using the above equation, this force may be expressed as −qkz. The equation of motion in the z direction for the ion is that of a simple harmonic oscillator, as follows $$-qkz=md^2z/dt^2.$$

t=travel time through the linear electric field and d is the differential operator symbol.

The solution of this equation is $$z=A(\sin[(kg/m)^{0.5}t+B])$$

where A and B are determined by initial conditions and drop out of the equation for time of flight. An ion entering the field at z=0 (at foil member 38) will return to the z =0 plane after having completed half of an oscillation cycle; that is, Z next equals zero when $$t=\pi(m/qk)^{0.5}$$

Rearranging, $$m/q=kt^2/\pi^2.$$

The computer of the data module 42 has look-up tables in memory with values of m/q versus various times of flight or m/q versus particle identity. This information has been previously calculated using the above equation and stored in memory. Alternatively, the computer is programmed to calculate m/q of each ion which is able to be timed. Output of information from the data module is by means of a CRT or a printer.

As mentioned above, neutral particles travel through the field and stop the clock upon striking the high end detector. They strike the center circular area of the detector since they are not deflected at all by the field. The data module then determines the m/q of the particle which entered the mass spectrometer and was converted to a neutral, but with lower resolution than if the particle had remained charged. The equation which was used to produce look-up tables stored in computer memory or which can be used by the computer is easily derived from the kinetic energy equation, which is $$E=\tfrac{1}{2}mv^2,$$

where v is particle velocity. The TOF equation is $$m/q=2\ Et^2/qD^2.$$

D=length of the particle path of travel through the linear electric field.

Neutrals travel through the field faster than ions having the same mass and energy because they are not subject to the deflecting force of the field. Also, neutrals are identifiable because they always strike the center region of the detector.

The equation above for motion of a simple harmonic oscillator also applies to ions which possess sufficient energy to pass through the field before being deflected, that is, ions which would be deflected if the field were longer. There is no confusion between these and electrons and neutrals because the travel times of electrons and neutrals are faster. It can be seen that the mass spectrometer is capable of supplying low resolution information on higher energy particles.

When the particle entering the LEF module is an ionized molecule, it is broken up into fragments by the foil. The acceleration potential on foil element 38 ensures that every particle has a minimum energy when it strikes the foil element. Upon break-up, this energy is partitioned according to the mass fractions of the fragments. These fragments do not have the energy to reach the most linear part of the electric field and are turned around quickly; they have anomalous transit times. Data module 42 uses these special TOF times to identify various mass species that come from molecular ions. The spectrometer can distinguish between incident H ions and H ions resulting from molecular break-up; these will be two distinct peaks on an output plot. Incident multiply charged ions that have their charges reduced by foil element 38 but still retain some positive charge will be retarded in the electric field and strike high end detector 44; they will have transit times that tend to uniquely identify them.

The electrical potential applied to the electrostatic analyzer can be varied over time so that ions of all charges and at all energy levels will be captured and analyzed.

Calibration information is loaded into the data module for use, in addition to m/q, in identifying certain species. This is useful in identifying more complex particles, such as molecules. For example, formaldehyde ions may be accelerated into an LEF module and the information collected entered into the data module to assist in identifying the species, should it be encountered at a later time.

Figure 6:
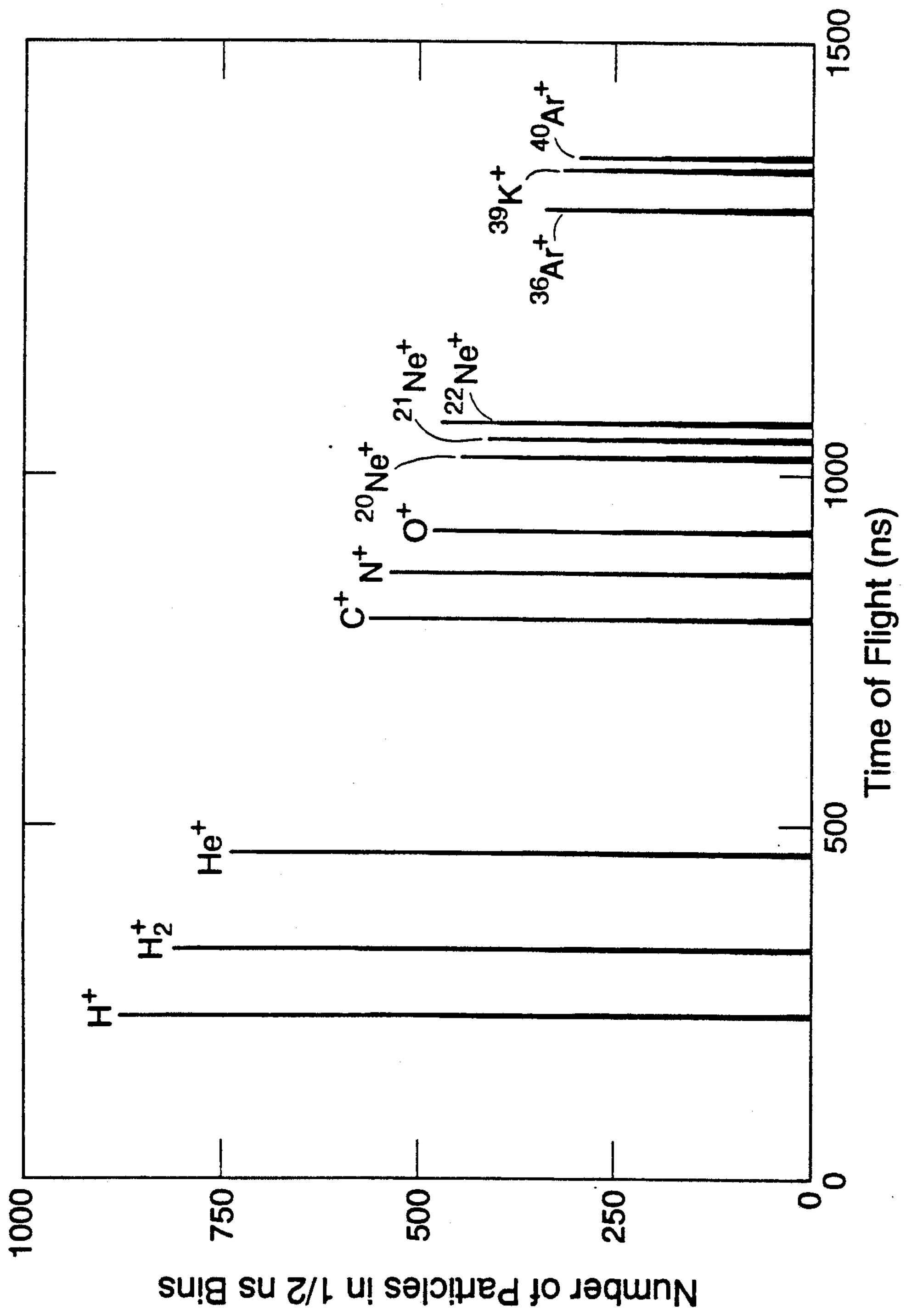
FIGS. 6 and 7 are simulated mass spectrometer output plots.
Figure 7:
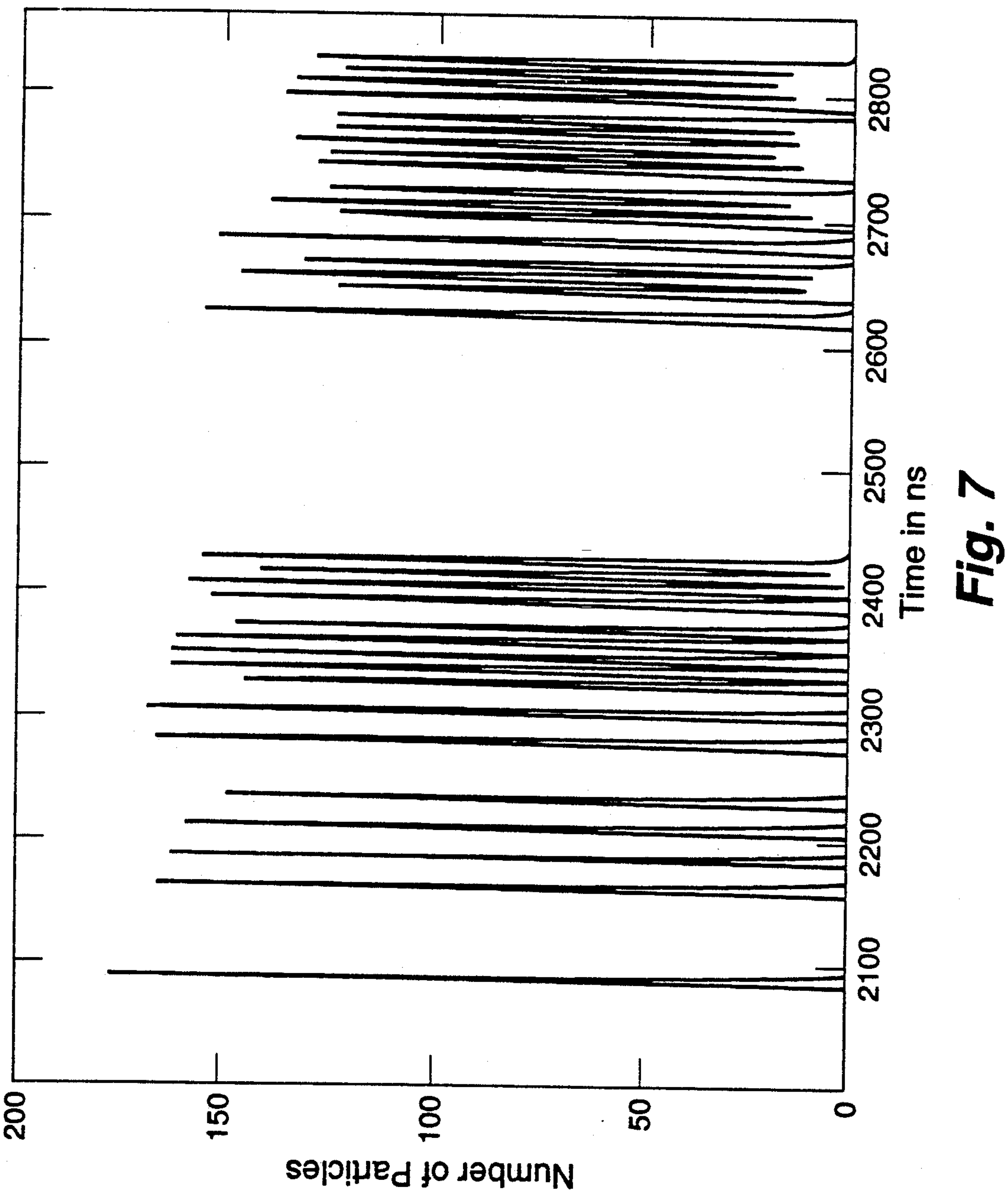
Figure 8:
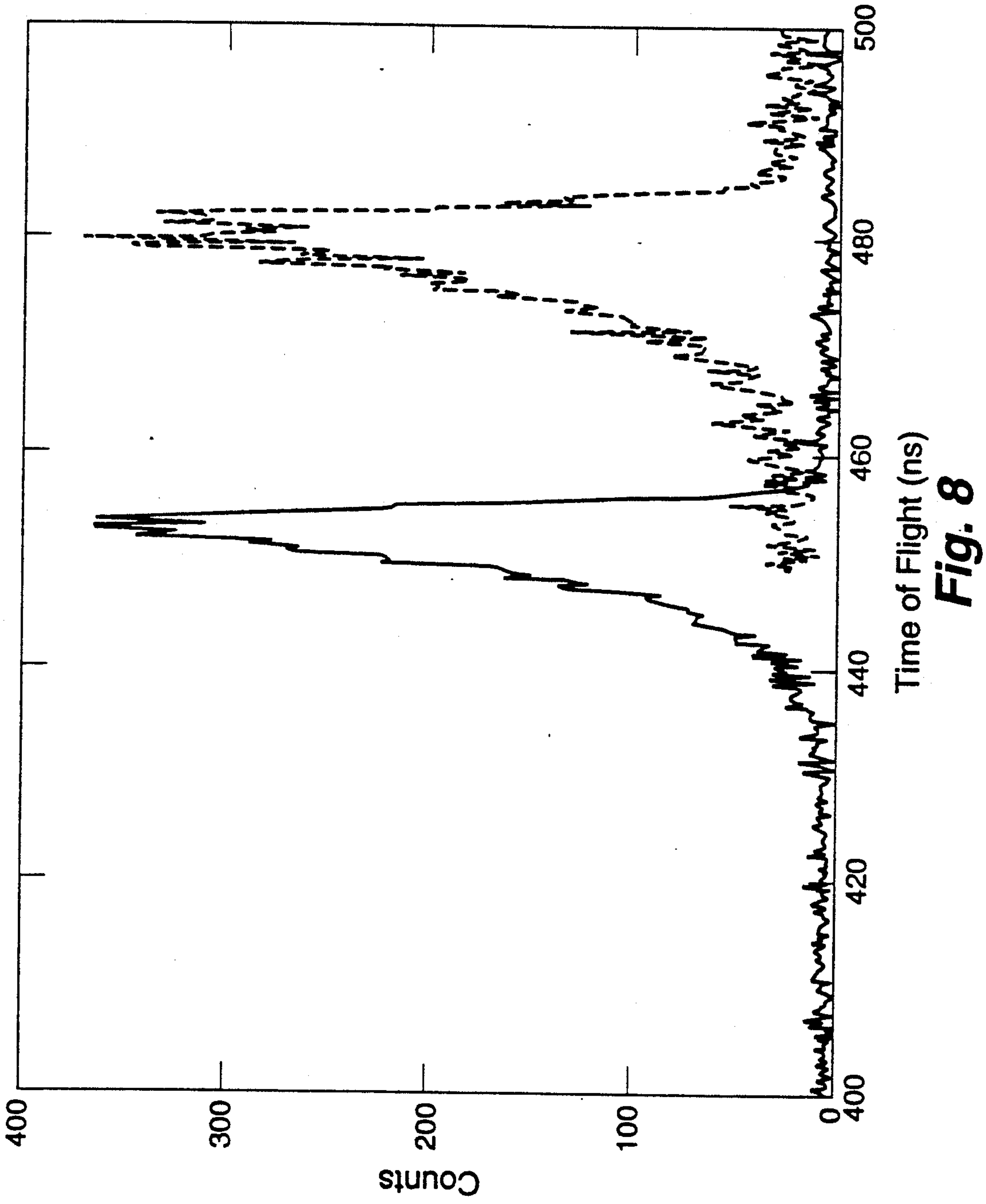
FIG. 8 is a simulated output plot from the prototype LEF module when nitrogen and oxygen ions were supplied to it.

FIG. 6 is a computer simulation which shows the expected performance of the mass spectrometer. The times of flight were sorted into "bins" having a "width" of one-half nanosecond. FIG. 7 is a computer simulation of mass spectrometer results from a very complex plasma; this is indicative of desired performance levels of the instrument after additional development has been accomplished. The species which the peaks represent and their atomic weights are listed in Table II, starting with the leftmost peak, which is krypton having an atomic mass of 83. FIG. 8 shows an actual output from the prototype data module when supplied with oxygen and nitrogen ions by the duoplasmatron in the laboratory.

TABLE III

| Atomic Mass Unit | Species | Atomic Mass Unit | Species |
|---|---|---|---|
| 83 | Kr | 133 | Xe, Cs |
| 89 | Sr | 134 | Cs |
| 91 | Y | 135 | Xe |
| 93 | Zr | 137 | Cs |
| 95 | Mo, Zr, Nb | 139 | la |
| 99 | Tc | 140 | Ba |
| 101 | Ru | 141 | Pr, Ce |
| 103 | Rh, Ru | 143 | Nd, Pr |
| 104 | Pd | 144 | Ce |
| 105 | Pd | 145 | Nd |
| 106 | Pd, Ru | 146 | Nd |
| 107 | Pd | 147 | Pm, Nd |
| 109 | Ag | 149 | Sm |
| 110 | Ag | 150 | Sm |
| 111 | Cd | 151 | Sm |
| 112 | Cd | 152 | Sm |
| 131 | Xe, I | | |

The mass spectrometer will function properly when the time interval between entering particles is at least 1-2 microseconds. If particles enter at a higher frequency, the device will become overloaded. The instrument analyzes positive ions and not negative ions; there are few ions in space which have added electrons.

This mass spectrometer has higher resolution and dynamic range than any other three dimensional mass analyzer available for space applications. Field-free mass spectrometers have limited resolution [(m/q)/Δ(m/q)] of approximately 8. The LEF is capable of resolutions in excess of 100 over a greater range of energies than is possible in a magnetic spectrometer. Also, the LEF provides the ability to unambiguously distinguish molecular species. This has been one of the major challenges of space plasma mass analysis. Examples of the importance of this are the $N_2+$ and $CO+$ species, which have very important and distinct roles in chemical models of plasma origins. However, since they have the same m/q ratio (to 1 part in 2800), other mass spectrometers cannot distinguish them. The same is true for $He++$ and $H_2+$. They require a conventional resolution of only 145 to be separated but have only been distinguishable in the past in devices with very limited energy coverage. The LEF is able to distinguish them because the molecular species break-up in the entry foil and produce a unique timing signature without requiring an overall resolution of either 145 or 2800.

The LEF is also unique in providing high mass resolution and wide energy coverage in a package that can view space in three dimensions. The 360° entry of the LEF allows it to be mated with energy analyzers that have a pancake shaped field of view or sweep out all of space with voltage variations on steering plates. In the case of a device with a pancake shaped field of view, the entire device is rotated to provide a three dimensional view of space. This is easily done, as many spacecraft spin or provide rotating instrument platforms. For spacecraft that do not have a spinning platform available, other energy analyzers that vary the elevation of the annulus they view are usable.

We claim:

1. A method for mass spectrometry in a vacuum comprising:

a. capturing positive ions having an E/q in an adjustable previously specified range, where E/q is the energy possessed by each of said ions divided by the charge of the ion;

b. adding a known quantity of energy (E) to each of said ions;

c. forming a three-dimensional electric field which varies in strength in a substantially linear manner from a minimum at a location denoted the entrance end to a maximum at a location denoted the high end;

d. passing each of said ions into said linear electric field through a foil member located at the low end of said field, where said passage through said foil member may change the ion to a neutral particle or may otherwise alter the charge state of the ion and may cause an electron to be emitted from the surface of the foil member facing the electric field;

e detecting ions, electrons, and neutral particles which reach the high end of the field and noting the times at which they reach the high end;

f. detecting ions which travel into the field and then return to the entrance end of the field and noting the times at which they reach the low end; and g. identifying the ions captured in step a which caused an electron to be emitted from the foil utilizing:
(1) E/q, as determined by means of step a;
(2) the energy added to each ion in step b;
(3) the times at which ions, electrons, and neutral particles arrive at the high end of said field, which are determined in step e;
(4) the times at which ions reach the entrance end of said field, which are determined in step f;
(5) equations which express m/q of a particle in terms of the time of flight of the particle through the electric field, where m is the mass of the particle; and
(6) calibration information previously collected by subjecting known ions to this method.

2. A method for mass spectrometry comprising:
a providing a vacuum in which to perform this method;
b. ionizing molecules or atoms;
c. forming a three-dimensional electric field which varies in strength in a substantially linear manner from a minimum at a location denoted the entrance end to a maximum at a location denoted the high end;
d. accelerating said ions toward said electric field;
e. passing each of said ions into said linear electric field through a foil member located at the entrance end of said field, where said passage through said foil member may change the ion to a neutral particle or may otherwise alter the charge state of the ion and may cause an electron to be emitted from the surface of the foil member facing the electric field;
f. detecting ions, electrons, and neutral particles which reach the high end of the field and noting the times at which they reach the high end;
g. detecting ions which travel into the field and then return to the entrance end of the field and noting the times at which they reach the entrance end; and
h. identifying the ions of step b which caused an electron to be emitted from the foil, utilizing:
(1) the energy added to each ion in step d;
(2) the times at which ions, electrons, and neutral particles arrive at the high end of said field, which are determined in step f;
(3) the times at which ions reach the entrance end of said field, which are determined in step g;
(4) equations which express m/q of a particle in terms of the time of flight of the particle through the electric field, where m is the mass of the particle; and
(5) calibration information previously collected by subjecting known ions to this method.

3. Apparatus for mass spectrometry in a vacuum comprising:
a. means for capturing positive ions having an E/q in an adjustable previously specified range, where E/q is the energy possessed by each of said ions divided by the charge of the ion;
b. means for adding a known quantity of energy to each of said ions;
c. means for forming a three-dimensional electric field which varies in strength in a substantially linear manner from a minimum at a location denoted the entrance end to a maximum at a location denoted the high end;
d. a foil member which is located at the entrance end of said electric field such that said captured ions having energy added will pass through it and into said electric field, where passage of an ion through said foil member may change the ion to a neutral particle or may otherwise alter the charge state of the ion and may cause an electron to be emitted from the surface of the foil member facing the electric field;
e. means for detecting ions, electrons, and neutral particles which reach the high end of the field and recording the times at which they teach the high end;
f. means for detecting ions which travel into the field and then return to the entrance end of the field and recording the times at which they reach the entrance end;
g. computer means for acquiring data from and providing control input to said mass spectrometry apparatus, processing data, and displaying information including the identity of said captured ions.

4. The apparatus of claim 3 where said means for capturing positive ions is an electrostatic analyzer.

5. The apparatus of claim 3 where said means for forming a three-dimensional electric field which varies in strength in a substantially linear manner from a minimum at said entrance end to a maximum at said high end comprises:
a. a plurality of identical rings, each being a circular flat plate having a circular center portion removed to form an annular shape, which are disposed parallel to one another such that they share a common central axis and are spaced apart at equal intervals;
b. a entrance end plate and a high end plate, which are circular flat plates of the same diameter and thickness as said rings, which are disposed parallel to said rings, one at each end of said plurality of rings, which are spaced apart from the end rings by a distance equal to the ring spacing, and which have the same central axis as the rings; and
c. means for applying voltages of varying magnitudes to the rings and end plates where said voltages vary from a minimum voltage at the ring adjacent to said entrance end plate to a maximum voltage at the ring adjacent to said high end plate and increase in a manner approximately proportional to the square of the distance from the entrance end.

6. The apparatus of claim 3 where said means for detecting particles of items 3*e* and 3*f* are comprised of multichannel plates located at said end caps.

7. The apparatus of claim 3 where the identities of said captured ions is determined in said computer means utilizing:
a. E/q;
b. the known quantity of energy added to each ion;
c. the times at which ions, electrons, and neutral particles reach the high end of said field and at which ions reach the entrance end of said field;
d. equations which express m/q of a particle in terms of the time of flight of the particle through the electric field, where m is the mass of the particle; and
e. calibration information previously collected by subjecting known ions to this method.

8. Apparatus for mass spectrometry comprising:
a. means for ionizing molecules or atoms of a gas;
b. means for providing said gas to said ionizing means;

c. means for forming a three-dimensional electric field which varies in strength in a substantially linear manner from a minimum at a location denoted the low end to a maximum at a location denoted the high end;
d. means for accelerating said ions toward said electric field;
e. a foil member which is located at the entrance end of said electric field such that ions from item d will pass through it and into said electric field, where passage of an ion through said foil member may change the ion to a neutral particle or may otherwise alter the charge state of the ion and may cause an electron to be emitted from the surface of the foil member facing the electric field;
f. means for detecting ions, electrons, and neutral particles which reach the high end of the field and recording the times at which they teach the high end;
g. means for detecting ions which travel into the field and then return to the entrance end of the field and recording the times at which they reach the entrance end;
h. computer means for acquiring data from and providing control input to said mass spectrometry apparatus, processing data, and displaying information including the identity of said captured ions; and
i. a housing containing items, a, c, d, e, f, and g and means for providing a vacuum inside said housing.

9. The apparatus of claim 8 where said means for detecting particles of items 8*e* and 8*f* are comprised of multichannel plates located at said end caps.

10. The apparatus of claim 8 where said means for forming a three-dimensional electric field which varies in strength in a substantially linear manner from a minimum at said entrance end to a maximum at said high end comprises:

a. a plurality of identical rings, each being a circular flat plate having a circular center portion removed to form an annular shape, which are disposed parallel to one another such that they share a common central axis and are spaced apart at equal intervals;
b. a entrance end plate and a high end plate, which are circular flat plates of the same diameter and thickness as said rings, which are disposed parallel to said rings, one at each end of said plurality of rings, which are spaced apart from the end rings by a distance equal to the ring spacing, and which have the same central axis as the rings; and
c. means for applying voltages of varying magnitudes to the rings and end plates, where said voltages vary from a minimum voltage at the ring adjacent to said entrance end plate to a maximum voltage at the ring adjacent to said high end plate and increase in a manner approximately proportional to the square of the distance from the entrance end.

11. The apparatus of claim 8 where the identities of said molecules or atoms are determined in said computer means utilizing:

a. the quantity of energy added to each ion by item d;
b. the times at which ions, electrons, and neutral particles reach the high end of said field and at which ions reach the entrance end of said field;
c. equations which express m/q of a particle in terms of the time of flight of the particle through the electric field, where m is the mass of the particle; and
d. calibration information previously connected by subjecting known ions to this method.

* * * * *